(No Model.)
G. F. CHAPPELL.
Pill Rounding Machine.
No. 240,966.          Patented May 3, 1881.
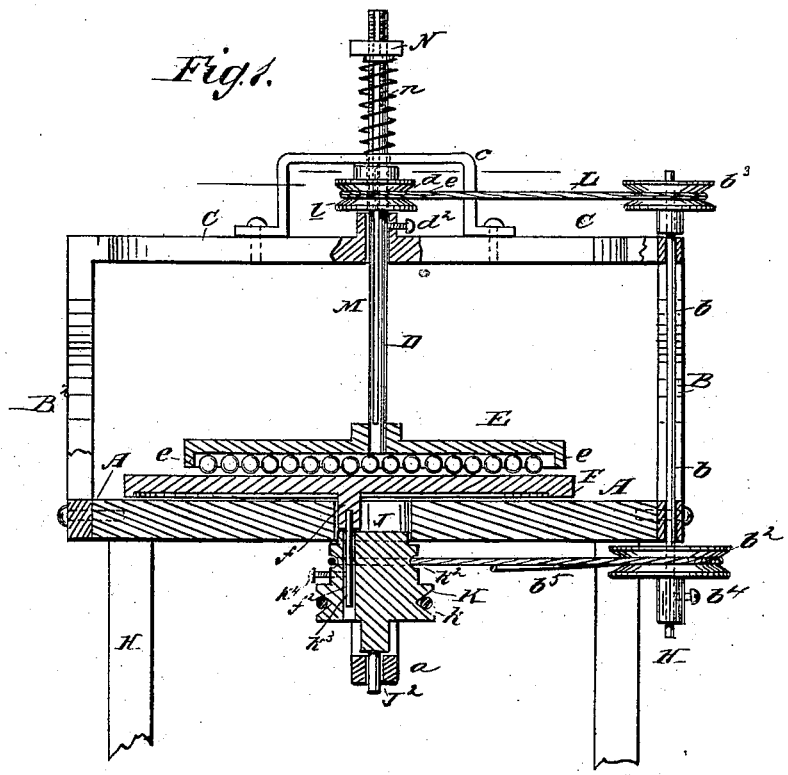
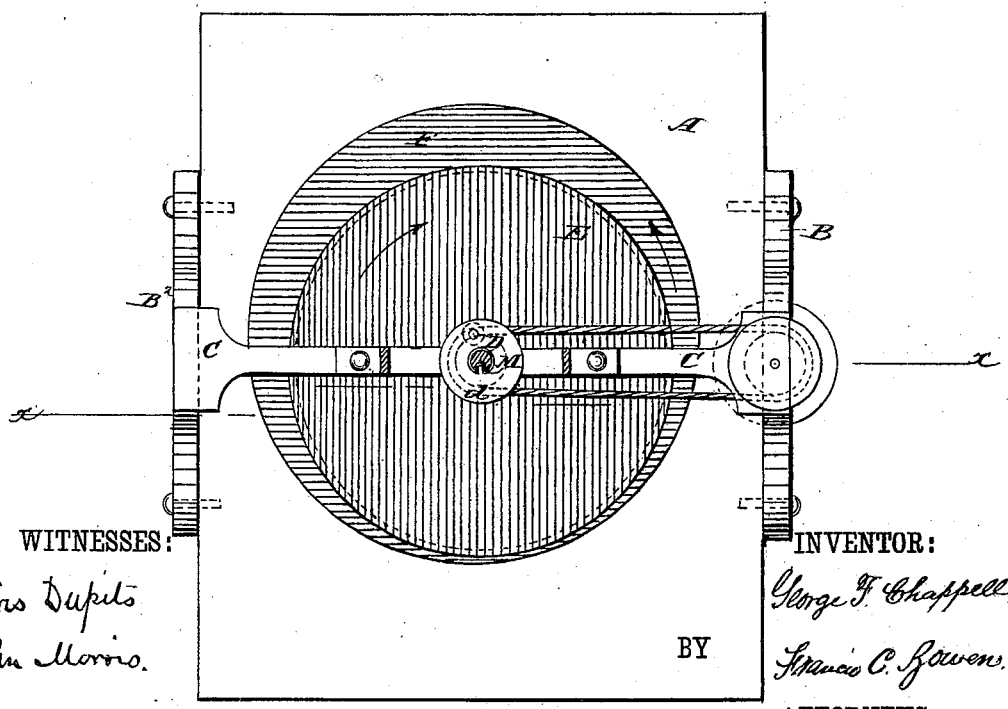
WITNESSES:
Morris Dupuis
John Morris
INVENTOR:
George F. Chappell
BY Francis C. Bowen
ATTORNEYS.

UNITED STATES PATENT OFFICE.

GEORGE F. CHAPPELL, OF NEW YORK, N. Y.

PILL-ROUNDING MACHINE.

SPECIFICATION forming part of Letters Patent No. 240,966, dated May 3, 1881.

Application filed April 2, 1881. (No model.)

*To all whom it may concern:*

Be it known that I, GEORGE F. CHAPPELL, of the city of New York, in the county of New York and State of New York, have invented certain new and useful Improvements in Pill-Rounding Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to means for rounding pills after they have been formed by the pill machine or cutter.

The invention consists, essentially, in a novel combination and arrangement of an eccentric plate and a concentric plate, together with other devices more particularly hereinafter described.

In the accompanying drawings, Figure 1 is a transverse vertical section of a machine embodying my invention, and Fig. 2 is a top view of the same.

A is a bed-plate supported by feet H H, and provided with a frame consisting of uprights B and $B^2$ and a cross-piece, C, having a bracket, $c$, attached to or constructed with it. The plate A is also provided with a bracket, $a$, depending from its under side.

F is an eccentric plate, provided on its under side with a stud or projection, $f$, to which is attached a shank or pivot, $f^2$.

K is a pulley having bearings in the apertures J of the plate A and $J^2$ of the bracket $a$, and provided with a groove, $k$, for a belt from the driving-power, and a groove, $k^2$, for a belt, $b^5$, for imparting motion to the pulley $b^2$. The pulley K has also, near the circumference of the upper face, a socket, $k^3$, extending vertically downward for the reception of the pivot $f$. This pivot fits loosely in the socket $k^3$, so that the plate F may simply go through a sweeping motion without turning when the pulley revolves; but by tightening the set-screw $k^4$ the plate will revolve in the same manner as an eccentric to a revolving shaft, in the usual way.

E is a concentric plate, having a downwardly-projecting rimmed edge, $e$, and carried by a vertical shaft, D. This shaft is provided with bearings in the cross-piece C and the bracket $c$, and has a groove, M, running in the direction of its length. A set-screw, $d^2$, is so arranged in the bearings that when tightened it will hold the shaft D and the plate E stationary.

$d$ is a pulley having a groove, $l$, for the belt L, and sliding freely in a vertical direction on the shaft D. It has a stud or key projecting inward for engagement with the groove M of the shaft D.

$b$ is a shaft having bearings in the uprights B, and having its lower end provided with a pulley, $b^2$, which has a set-screw, $b^4$, for tightening the same on the shaft, and a groove for the belt $b^5$, which conveys motion from the pulley K.

On the upper end of the shaft $b$ is a pulley, $b^3$, grooved for the belt L, which conveys motion to the pulley $d$ and shaft D.

N is a nut screwed on the upper end of the shaft D. Between this nut and the bracket $c$ is a spiral spring, $n$, for supporting and adjusting shaft D and plate E, as hereinafter described.

The mode of operating my invention is as follows: The plate E is raised to a convenient height, where it is secured by means of the set-screw $d^2$. The pills to be rounded are then placed on the plate F and the plate E lowered. If it approaches too closely to the plate F, the nut N is screwed farther on the shaft D, and, being supported by the spring $n$, raises said shaft. If the plates are too far apart, the nut N is unscrewed a suitable distance. When the machine is set in motion the pulley K gives to the plate F a sweeping circular motion, which, combined with the simple circular motion (preferably in the opposite direction) of the plate E, rolls the pills in such a manner as to give them a perfectly globular form in a very short time.

If it is preferred, the shaft D may be secured by the set-screw $d^2$, so that the plate E will remain stationary, the rolling being done by the plate F. In order to use the machine in this way it is not necessary to remove any of the belts, as by loosening the set-screw $b^4$ the pulley $b^2$ will revolve without moving the shaft $b$ and the pulley $b^3$.

The machine can be operated by means of a crank, or in any other suitable manner, as well as by a belt, as hereinabove described. My invention has been particularly described as having an eccentric plate and a concentric plate; but, if necessary, both the plates may be eccentric, or both may be concentric.

The advantages of my invention over the old pill-rounding apparatus are many and obvious. Some of the greatest are as follows:

First, by the former method the pills were rounded by hand, they being placed on a marble slab and rolled with a plate held in the hand of the operator. This plate was necessarily of a small size, and consequently but few pills could be manipulated, while by my invention a large number of pills can be rounded at the same time.

Second, the rounding of pills by the old method required about a quarter of an hour, while my invention requires only a few minutes.

Third, the pills rounded by hand were often not perfectly globular, which is never the case with pills rounded by my machine.

Fourth, before rounding pills by hand it was necessary to allow them to stand several hours to partly dry, while by my method they can be operated upon immediately after the forming and cutting operation.

Having thus fully described my invention, what I claim as new, and desire to secure by Letters Patent, is—

1. In a pill-rounding machine, the combination of an eccentric plate and a concentric plate arranged to revolve with pills between them, substantially as herein described.

2. In a pill-rounding machine, the combination, with a concentric driving-pulley, of a circular plate, F, arranged eccentrically with relation to said pulley by means of a pivot, $f$, socket $k^3$, and set-screw $k^4$, and adapted to move with a sweeping motion only, or with a combined sweeping and circular motion, substantially as herein described.

3. In a pill-rounding machine, the combination, with an eccentric plate, arranged as described, of a concentric plate, E, provided with means for holding it stationary, for rotating it, for vertically adjusting it, and for regulating its pressure, substantially as herein set forth.

4. The combination, with the shaft D, provided with the groove M, of the pulley $d$, provided with a stud or key for engagement with said groove, the cross-bar C, and bracket $c$, forming bearings for said shaft and a seat for said pulley, and the spring $n$ and nut N, for regulating the pressure of the plate, substantially as herein described.

5. The combination, with the plates E and F, of the pulleys K, $b^2$, $b^3$, and $d$, shafts $b$ and D, and belts $b^5$ and L, arranged as shown, for the purposes specified.

In testimony that I claim the foregoing I have hereunto set my hand this 30th day of March, 1881.

GEORGE F. CHAPPELL.

Witnesses:
FRANCIS C. BOWEN,
EDGAR GARRETSON.